United States Patent [19]

McDaniel

[11] 4,301,034

[45] Nov. 17, 1981

[54] SILICA FROM SINGLE PHASE CONTROLLED HYDROLYSIS OF SILICATE ESTER

[75] Inventor: Max P. McDaniel, Bartlesville, Okla.

[73] Assignee: Phillips Petroleum Company, Bartlesville, Okla.

[21] Appl. No.: 151,847

[22] Filed: May 21, 1980

[51] Int. Cl.$^3$ .................. B01J 21/08; B01J 21/06; B01J 23/26

[52] U.S. Cl. ................... 252/452; 252/458; 423/338; 526/106

[58] Field of Search ............ 252/452, 458; 526/106; 423/336, 338

[56] References Cited

U.S. PATENT DOCUMENTS

| | | | |
|---|---|---|---|
| 3,321,276 | 5/1967 | Burzynski et al. | 423/388 |
| 3,354,095 | 11/1967 | Burzynski et al. | 252/316 |
| 3,442,824 | 5/1969 | Chandler | 260/2 |
| 3,709,833 | 1/1973 | Thomas | 252/448 |
| 3,948,806 | 4/1976 | Witt | 252/451 |
| 3,979,215 | 9/1976 | Emblem et al. | 106/55 |
| 4,006,175 | 2/1977 | Termin et al. | 423/338 X |
| 4,119,569 | 10/1978 | Dietz | 252/452 |
| 4,188,471 | 2/1980 | Nasser, Jr. et al. | 526/96 |
| 4,206,297 | 6/1980 | Hoff et al. | 423/338 X |

Primary Examiner—Carl F. Dees

[57] ABSTRACT

A method comprising combining a silicate ester and water under hydrolysis conditions in the presence of a sufficient amount of solvent that the reaction mixture remains as a single phase, adding sufficient acid neutralizing agent to form a gel and separating solvent and water from the resulting silica. In a preferred embodiment, the ester and water are added to a very small amount of solvent, the addition of water being sufficiently slow that it is added at about the rate it is used up in the hydrolysis reaction. The resulting silica does not require the washing step to remove alkali metal ions since it is not made from sodium silicate, and it has large pore structure because it can be made in a relatively concentrated solution because of the use of only a minimum amount of solvent and also because the hydrolysis is carried out under conditions wherein only a single phase is produced. The resulting silica is suitable for chromatographic columns and fillers in rubber and plastics but is of primary utility as a base for a chromium oxide catalyst because of its simplicity in production and inherent large pore volume.

49 Claims, No Drawings

SILICA FROM SINGLE PHASE CONTROLLED HYDROLYSIS OF SILICATE ESTER

BACKGROUND OF THE INVENTION

This invention relates to the production of silica by hydrolysis of a silicate ester under controlled conditions.

It is well known to produce silica by a simple procedure wherein a sodium silicate solution is precipitated with an acidic material. This technique is inexpensive and gives a silica which inherently has sufficient strength to resist severe shrinkage of the pores during simple drying techniques such as oven drying, tray drying, spray drying, or drying under a heat lamp. Such a silica has relatively small pores, however, which is a disadvantage in some applications. Nevertheless, it can be used as a support for a chromium catalyst for olefin polymerization in a solution process with excellent results. However, in a slurry system such a catalyst tends to produce polymer having an excessively high molecular weight because the temperature, which is simply raised in solution systems to decrease molecular weight, must be kept low enough that the polymer does not go into solution.

It is known that titanium affects the polymerization activity of silica supported chromium catalysts in a way that is of special importance in slurry polymerizations. In particular, it gives a support which results in lower molecular weight polymer. In order to take full advantage of the improvement which can be imparted to the melt index capability through the use of titanium in accordance with the prior art, the titanium had to be coprecipitated with the silica and the resulting hydrogel (cogel) dried by a more expensive azeotrope distillation or washing with a liquid oxygen-containing water soluble organic compound so as to remove the rather substantial amount of water present because of the formation of the hydrogel in an aqueous system.

Also, in any procedure involving the precipitation of silica from a sodium silicate, the sodium ions must be washed from the final product which is a serious disadvantage.

It is known in the art to prepare a silica by the hydrolysis of an ester but this has heretofore resulted in the production of hard beads of silica which are not ideally suited for applications such as supports for chromium catalysts for olefin polymerization.

SUMMARY OF THE INVENTION

It is an object of this invention to directly produce silica having large pores; it is a further object of this invention to produce large pore silica without the necessity for removal of large amounts of water; it is still yet a further object of this invention to produce a silica without the necessity of washing out the remaining metal ions; it is still yet a further object of this invention to produce a silica by hydrolysis of an ester which is suitable as a base for a chromium catalyst; it is still yet a further object of this invention to produce an improved olefin polymerization catalyst and process.

In accordance with this invention, a silicate ester is hydrolyzed in the presence of a solvent in which the water, ester and the resulting silica gel are soluble or miscible under conditions such that a separate phase does not form during the hydrolysis, an acid neutralizer agent is added to form a gel, and the water and solvent are separated from the resulting silica. In the preferred embodiment of this invention, this is accomplished by combining the water and silicate esters slowly in the presence of a very small amount of initial solvent.

DESCRIPTION OF THE PREFERRED EMBODIMENTS

Large pore silica can be prepared according to this invention by hydrolyzing a silicate ester with a suitable quantity of water in a solvent under conditions such that only one phase is present. This can be accomplished without the use of an emulsifier. Prior to gelling the silica with an acid neutralizing agent, a soluble titanium compound and/or a soluble chromium compound can be added, if desired. After gelation of the organosol is accomplished, particle growth and aging steps are preferably carried out and then the relatively small amount of water and the solvent present can be removed.

Since the invention gels are not derived from an alkali metal silicate by reaction with an acid as in many conventional prior art processes, the gels are not contaminated with alkali metal cations and the corresponding anions. Thus there is no need to remove any contaminating ions by water washing followed by removal of the large amount of water introduced as in the prior art.

The silicate esters utilized in forming the gels of this invention can be represented as $Si(OR)_4$ where R is an alkyl group containing from 1 to 6 carbon atoms, preferably from 3 to 4 carbon atoms. A presently preferred compound is tetra-n-propyl orthosilicate because of its availability, relatively low cost, and effectiveness in the process. Other suitable esters are tetra-isobutyl orthosilicate, tetra-n-pentyl orthosilicate, tetra-iso-pentyl orthosilicate, tetra-n-hexyl orthosilicate.

The organic solvent employed in the process can be any liquid which mutually dissolves or is at least sufficiently miscible with water, the silicate ester and the resulting hydrolyzed silica that phase separation does not occur during the hydrolysis. Preferably, oxygen-containing, normally liquid organic materials are used although other materials such as amines can be used. It is most convenient to use a saturated, aliphatic alcohol containing from 1 to 6 carbon atoms, preferably 3 to 4 carbon atoms as the solvent, since an alcohol is formed from the silicate ester during its hydrolysis. Most preferably, the alcohol and ester are chosen so that the ester on hydrolysis gives the same alcohol as is already present or at least has the same number of carbon atoms. Exemplary solvents include acetone, methyl ethyl ketone, ethyl acetate, methanol, ethanol, 1-propanol, isopropanol, 1-butanol, 2-butanol, 2-methyl-1-propanol, 2-methyl-2-propanol, 1-pentanol, 2-pentanol, 3-methyl-1-butanol, 3-methyl-2-butanol, 3-pentanol, 2-methyl-2-butanol, 2,2-dimethyl-1-propanol, 2-methyl-1-butanol, 1-hexanol, and the like. Presently preferred compounds include ethanol and the 3- and 4-carbon alcohols because of their availability and good solubility in water. The 3 and 4 carbon atom alcohols are preferred over ethanol because of their slightly lower volatility which is best suited for use in this invention.

In one embodiment, the $Si(OR)_4$ is made in situ by reacting $SiX_4$ where X is bromine, chlorine or iodine with an alcohol, e.g., $SiX_4 + 4ROH \rightarrow Si(OR)_4 + 4HX$. The HX formed is removed by refluxing the reaction mixture and/or purging it with an inert gas such as argon, carbon dioxide or nitrogen. The preferred $SiX_4$ is $SiCl_4$ because of its ready availability and relatively low cost. Alternatively commercially available silicate esters can be used.

It is preferred that the amount of water utilized in the hydrolysis reaction itself by relatively small. Preferably, the amount of water employed is about the stoichiometric amount. From 0.8 to 5, preferably 0.9 to 2, more preferably from 1.0 to 1.2 times the stoichiometric amount necessary to react with all or essentially all of the ester groups in the silicate ester can be used. Care must be exercised in the procedure of combining the silicate ester and the water, particularly at the start to avoid any coprecipitated material or gel forming prematurely. That is, only one phase is present until gelation is effected. Indeed, no phase separation occurs at all unless the gelation itself is regarded as a phase separation which it is not in the usual sense of the word. This can be accomplished in two ways.

First, only a very small amount of solvent is used initially. For instance, as little as 0.1 volume percent solvent based on the total amount of ester to be added, can be utilized initially. Generally, about 0.1 to 10 volume percent solvent based in the total ester is used initially. Generally, a very small amount of water and a hydrolysis catalyst such as the well known acid catalysts are present with the solvent. Then the ester and water are slowly or incrementally added, i.e., at a rate such that the water is used up in the hydrolysis about as fast as it is added. The alcohol resulting from the hydrolysis provides the additional solvent needed to maintain the hydrolyzed silica in solution as it is formed, thus keeping the amount of solvent to a minimum. This is desirable because a more concentrated solution inherently gives greater strength to the resulting silica and hence less collapse on drying and hence larger pore size.

Alternatively, a sufficient amount of solvent can be used initially so that all of the water and ester can be added essentially simultaneously without phase separation. This is less desirable, however, since the more dilute gel gives a lower strength silica. As with the first procedure, a conventional hydrolysis catalyst can be present.

The hydrolysis catalyst utilized during the hydrolysis reaction can be a conventional catalyst as is well known in the art. For instance, a strong mineral acid such as sulfuric acid can be employed during hydrolysis in small (catalytic) quantities to expedite the reaction, e.g., from about 0.0005 to about 0.05 mole acid per mole of water used in the hydrolysis per se. Other acids can be used but sulfuric is preferred. HCl, for instance, can give corrosion problems and nitric acid can cause oxidation problems.

The reaction temperature employed can vary from about room temperature (about 25° C.) to the boiling point of the initial reaction mixture. It is often convenient to conduct the reaction at reflux temperature of the reaction mixture so as to minimize the time required for this operation and improve the solubilites of the reactants.

If is is desired to introduce a titanium compound, it has been found that an unexpected advantage results from carrying out this introduction after at least a part of the hydrolysis has been carried out and before any excess water is added. It was found that when the titanium compound was added before any hydrolysis had occurred it formed an undesirable precipitate. Similarly, if it was added after any excess water was added, it formed a precipitate. But if added after at least some, preferably essentially all of the hydrolysis is carried out, but before any excess water is added, a titanium cogel is formed on gelation.

In this way, the titanium does not form an undesirable precipitate. Any titanium compound soluble in the reaction mixture can be used. The titanium compounds most prone to precipitate in other systems are the alkoxides and compounds convertable to the alkoxide in the reaction mixture. But even these alkoxides and compounds convertable to the alkoxide in the reaction mixture do not precipitate in this invention if added after the hydrolysis and before gelation. The alkoxides are preferred because they actually form a compound or complex with the silica as opposed to just being physically admixed therewith (hence time to react before any excess water is added should be allowed). Dietz, U.S. Pat. No. 3,887,494, the disclosure of which is hereby incorporated by reference discloses other suitable titanium compounds. Most preferred of the titanium alkoxides are those of the general formula $Ti(OR')_4$ wherein $R'$ is a 1 to 6, more preferably 2 to 4 carbon atom alkyl group. Generally, the titanium compounds are alcohol soluble.

After hydrolysis and before gelation, it is generally desirable to subject the thus hydrolyzed silicate ester to a particle growth step. To accomplish this, water is preferably added to the pot until for each gram of silica present, there is 5 to 20 cc of solution, preferably about 10 cc per gram of $SiO_2$. While excess water is to be avoided during the hydrolysis to avoid forming separate phases, excess water at this point is desirable to favorably influence particle growth. This is still less water than is generally present during conventional silica formation from an alkali metal silicate. In no event should the total $H_2O$:silicate mole ratio be greater than 20:1. In the less preferred embodiment where excess solvent is used and if no titanium is to be added, the excess water for the particle growth step can be present initially. The solution is given time for particle growth, for instance, from 0.1 to 10, preferably 1 to 5 hours, preferably at reflux temperature although any temperature from room temperature up to the reflux temperature can be utilized.

After the hydrolysis is essentially complete, the organosols produced according to this invention are gelled by the introduction of a gelling agent which neutralizes acid. Suitable gelling agents are generally bases and include ammonia and normally gaseous or liquid primary, secondary or tertiary alkyl or cycloalkyl amines which are at least partially soluble in water or the organic solvent employed. Examples of the amines include methylamine, ethylamine, dodecylamine, octadecylamine, 2-ethylhexylamine, cyclohexylamine, diisopropylamine, didodecylamine, trioctylamine, trialkylamine, and the like. The preferred gelling agent is ammonia because of its ready availability, low cost, and ease of removal of surplus amounts. Other acid neutralizing agents include ethylene oxide and propylene oxide and other hydrocarbyl oxides.

During the hydrolysis, i.e., prior to gelation, the ingredients must, of course, be mixed. This can be accomplished simply by the boiling action of the reflux if the operation is carried out at reflux temperature. Alternatively, mechanical stirring can be utilized and is preferred although such is not necessary. During and after gelation, the mechanical stirring should be kept to an absolute minimum or avoided altogether especially after gelation is complete since the stirring causes the production of fines in the final silica product.

After gelation, it is preferred to age the gel for a time of at least 0.5 hours, preferably 1 to 50 hours, more preferably 1 to 4 hours. Longer times can be used but are not needed. Preferably, an additional amount of solvent, e.g., alcohol as defined above is added. This can be in an amount within the range of 0.1 to 10, preferably about one volume of solvent for each volume of gel. This can be done at any temperature from room temperature to reflux temperature for the solvent, but preferably is at or about the reflux temperature.

The hydrogel, after aging if aging is employed, is then subjected to a water removal step to remove the relatively small amount of water and most of the solvent present. This can be done by several methods. In one method, the water and solvent are removed as an azeotrope, optionally after the addition of additional solvent. In another method, the liquid is drained from the gel and the gel is washed with an organic liquid in which water is at least partially miscible, to remove at least most of the water. A suitable solvent for the azeotrope or washing step is a normally liquid oxygen-containing organic material such as an alcohol or carboxylic acid ester such as ethyl acetate. Following each method, the water-free, or substantially water-free, gel, cogel or tergel can be dried in a conventional manner, for instance in an oven, to remove the organic solvent without danger of harming the relatively fragile, large pore silica structure. Other suitable drying techniques include the use of a vacuum oven as tray drying. The temperature can be from room temperature to 425° C. or higher but is preferably about the boiling point of the organic solvent.

If the amount of water is sufficiently small or the boiling point of the solvent is sufficiently high, the gel can simply be placed directly in the oven or other drying means and dried.

If it is desired to produce a tergel, that is coprecipitated silica, titanium, and chromium, chromium material which is soluble in the solvent such as chromium acetate, chromic nitrate, and other solvent soluble chromium compounds (generally chromium(III) compounds) can be added to the hydrolyzed ester before gelation. Chromium(III) acetate is preferred. If a tergel is formed, it is preferred to add the titanium compound before the chromium compound. The amount of chromium compound employed is sufficient to provide from about 0.001 to 10 weight percent, preferably 0.1 to 5, most preferably 0.5 to 1 weight percent chromium based on the weight of the activated catalyst. It is also possible to add the chromium and even the titanium to the hydrogel prior to water removal. If added at this stage, the same scope of alcohol soluble chromium or titanium compounds can be used as those used before gelling. Also, water soluble compounds such as $CrO_3$, chromic sulfate, chromous sulfate, and ammonium chromate can be used.

Alternatively, chromium and/or titanium can be added after the material is dried, preferably by means of an anhydrous impregnation or simple physical mixing with the resulting xerogel. For instance, an anhydrous solution of a titanium compound such as a titanium alkoxide can be used to incorporate titanium into the dried silica. Similarly, an anhydrous solution of chromium compound soluble in nonaqueous solvents such as hydrocarbons can be added to the dried silica (xerogel). Suitable chromium compounds for anhydrous introduction of chromium include diarene chromium compounds as described in Delap, U.S. Pat. No. 3,976,632 (Dec. 4, 1974), the disclosure of which is hereby incorporated by reference; alkyl or aryl esters of chromic acid and chromium acetylacetonate as described in Hill, U.S. Pat. No. 3,349,067 (Oct. 24, 1967), the disclosure of which is hereby incorporated by reference; bis(cyclopentadienyl) chromium(II) compounds as described in Karpinka, U.S. Pat. No. 3,709,853 (Jan. 9, 1973), the disclosure of which is hereby incorporated by reference; and silyl chromates as described in Johnson, U.S. Pat. No. 3,704,287 (Nov. 28, 1972), the disclosure of which is hereby incorporated by reference. Generally, a solution or slurry of the chromium compound is a dry organic liquid inert to the compound and the silica is used to incorporate the chromium. Examples of suitable organic liquids include paraffins, such as n-heptane, cycloparaffin such as cyclohexane and aromatic hydrocarbon, such as benzene. Following the contacting, the composite is dried.

Most preferably an alcohol soluble titanium compound is introduced after hydrolysis, then particle growth is carried out and then a water soluble chromium compound is added after which gelation is carried out.

The treated silicas of this invention are suitable for use in chromatographic columns and as fillers in plastics and rubber. However, the primary utility is as a base for incorporation of chromium for an olefin polymerization catalyst. In the catalyst embodiments, after the incorporation of the chromium compound and the drying of the silica, the composite is activated in a manner conventional in the art with the particular type of chromium compound used. Preferably, the composite is activated by contact with an oxygen-containing ambient such as air at a temperature ranging from about 15° to 870° C., preferably 315° to 760° C. As noted, the preferred ambient is air. However, any oxygen-containing ambient having from 2 to 100% oxygen and from 0 to 98% of an inert gas such as nitrogen can be used. In some instances, it is desirable to use a controlled smaller amount of oxygen by utilizing a nitrogen-air mixture. It is also possible, although much less preferred, to activate the $\pi$-bonded organochromium compounds, particularly the dicyclopentadienyl chromium(II) compounds in an inert atmosphere such as nitrogen for the same times and temperatures used with oxygen. Following the activation, the catalysts are cooled and stored in a dry, inert atmosphere until ready for use.

The activation times will generally be at least 5 minutes, preferably 10 minutes to 10 hours, more preferably 30 minutes to 3 hours.

The catalysts of this invention can be used to polymerize at least one mono-1-olefin containing 2 to 8 carbon atoms per molecule. The invention is of particular applicability in producing ethylene homopolymers and copolymers from mixtures of ethylene and 1 or more comonomers selected from 1-olefins or dienes containing 3 to 8 carbon atoms per molecule. Exemplary comonomers include aliphatic 1-olefins, such as propylene, 1-butene, 1-hexene, and the like and conjugated or nonconjugated diolefins, such as 1,3-butadiene, isoprene, piperylene, 2,3-dimethyl-1,3-butadiene, 1,4-pentadiene, 1,7-hexadiene, and the like and mixtures thereof. Ethylene copolymers preferably constitute about 90, preferably 95 to 99 mole percent polymerized ethylene units. Most preferred monomers are at least one of ethylene, propylene, 1-butene, and 1-hexene.

The polymers can be prepared from the activated catalysts of this invention by solution polymerization, slurry polymerization, and gas phase polymerization techniques using conventional equipment and contacting processes. However, the catalysts of this invention are particularly suitable in slurry polymerizations for the production of high melt index (MI) polymers. Particle form (slurry) polymerizations are carried out in an inert diluent such as a paraffin, aromatic or cycloparaffin hydrocarbon at a temperature where the resulting polymer is insoluble. For predominantly ethylene polymer, the particle form process is carried out at a temperature of about 66° to 110° C.

The catalysts of this invention can be used with conventional cocatalysts such as triethylaluminum if desired. Also, hydrogen can be used to further increase the melt index if desired.

Example I—Catalyst Preparation

A series of catalysts was prepared from the specified materials below by conducting the process in a flask arranged for stirring, entry or reagents, and refluxing.

Catalyst A

A flask was charged with 97 mL (90.5 g, 0.435 mole) of tetraethyl orthosilicate, 18 g (1 mole) of water, 0.25 mL (0.49 g, 0.005 mole) of concentrated sulfuric acid, and 133 mL (107.5 g, 1.45 moles) of 2-butanol. Because of the large excess of solvent, 2-butanol, it was possible to essentially simultaneously introduce the ester and water. This represents an early experiment, it later having been determined that it was preferred to utilize a smaller amount of solvent and more carefully control the addition of the water and ester so as to avoid the presence of the excess solvent which causes the lower strength gel to form because of the dilution. However, as shown hereinbelow, this procedure nonetheless gave outstanding results. The initial mole ratio of $H_2O$:$Si(OC_2H_5)_4$ was about 2.3:1. Note, a 2:1 ratio would be stoichiometric, i.e.,

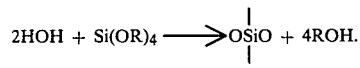

As can be seen, this is just slightly over a stoichiometric amount based on the amount of ester groups. The hydrolysis was essentially complete at this point and thus additional water is no longer harmful.

The hydrolysis now being completed, titanium could be added without precipitation, and since gelation has not yet occurred, it was still possible to stir without causing any harm. To the stirred mixture was slowly added 5.5 mL (5.25 g, 0.0185 mole) of titanium tetraisopropoxide, and then 72 g (4 moles) of water. The final $H_2O$:$Si(OC_2H_5)_4$ was about 11.5:1. Finally chromium(III) acetate solution contained in 25 mL of methanol was added to the mixture to provide 1 weight percent chromium, based on the calcined final composite. The mixture was heated to boiling with stirring for 30 minutes (particle growth). Heating was discontinued and sufficient ammonia gas was passed into the mixture to form the tergel (gelation). At that point, 300 mL of 2-butanol and 3 mL of concentrated ammonium hydroxide were added and the mixture was set aside undisturbed for 2 days (over the weekend). When work-up was resumed, 100 mL of toluene was added to the flask and the mixture refluxed for 2 hours after which the water was removed as an azeotrope. The toluene serves the purpose of forming two phases between the water and the toluene-alcohol azeotrope coming off so as to facilitate removing the water from the azeotrope, (i.e., two phases in the collector but still just one phase in the vessel with the gel). As liquid was removed during the distillation, the 2-butanol was separated from the water. In a commercial operation, the 2-butanol would be recycled but in this laboratory experiment new solvent was fed to the flask to keep the reaction volume constant. After the water was removed, the tergel was recovered by filtration and the product dried in a vacuum oven to remove solvent and calcined for about 5 hours at 760° C. in air. The recovered catalyst was analyzed and found to have a pore volume of 2.3 mL/g and a surface area of 550 m²/g.

Catalyst B

A mixture was formed from 97 mL (0.435 mole) of tetraethyl orthosilicate, 90 g (5 moles) of water, 133 mL (1.45 mole) of 2-butanol, and 0.25 mL (0.005 mole) of concentrated sulfuric acid. Thus, the initial mole ratio $H_2O$:$Si(OC_2H_5)_4$ was about 11.5:1. Again, sufficient solvent was present so that all of the ester and water could be added essentially simultaneously. It was later discovered that it was preferred to use a silicate ester higher than ethyl so as to form an alcohol on hydrolysis more suitable as a solvent because of the higher boiling point. However, as can be seen by the data as set out hereinbelow, outstanding results were obtained even in this run. To the stirred mixture was added 25 mL of the chromium(III) acetate dissolved in methanol to provide 1 weight percent chromium based on the final calcined product, and the mixture heated to boiling for 30 minutes (particle growth). Heating was discontinued and sufficient ammonia gas was passed into the mixture to form the gel (gelation). Then 300 mL of 2-butanol, 3 mL of concentrated ammonium hydroxide and 50 mL of toluene were added to the flask and the mixture refluxed for 2 hours (aging). Water was then removed as the azeotrope, with 2-butanol being separated and recycled. The water-free mixture was set aside, undisturbed for the weekend. When work-up was resumed, 5.5 mL (0.0185 mole) of titanium tetraisopropoxide was mixed into the gel. The mixture was recovered by drying in a vacuum oven and that product calcined in air at 760° C. for about 5 hours to produce the catalyst. Analysis showed the pore volume to be 3.5 mL/g and the surface area to be 540 m²/g.

Silica $C_1$ and $C_2$

This run demonstrates a preferred embodiment of the invention where a relatively small amount of solvent was utilized with the ester and water being added slowly by means of incremental addition. It was later discovered that even smaller amounts of solvent could be used initially in this preferred embodiment wherein the ester and water are introduced slowly and/or incrementally. It was later discovered that it was preferred to utilize less water during the hydrolysis, i.e., about a stoichiometric amount and add the additional water to the particle growth step after hydrolysis is essentially complete. However, as the results hereinbelow show, the technique of this run gave outstanding results.

A mixture was formed from 40 mL (0.536 mole) of 1-propanol, 20 g (1.11 mole) of water, and 2 mL (0.04 mole) of concentrated sulfuric acid and the stirred mixture was heated to refluxing. Thereupon, was slowly added 100 mL (0.348 mole) of tetra-n-propyl orthosilicate. Thus, the initial mole ratio of $H_2O:Si(OC_3H_7)_4$ after that addition was about 3.2:1. While keeping the mixture refluxing, there was slowly added in order, 100 mL (5.55 moles) of water, 100 mL of $Si(OC_3H_7)_4$, 100 mL of water, 100 mL of $Si(OC_3H_7)_4$ and 60 mL of water. In all, 300 mL of $Si(OC_3H_7)$ was used, 280 mL of water, 40 mL of 1-propanol, and 2 mL of sulfuric acid. The overall $H_2O:Si(OC_3H_7)_4$ mole ratio was about 14.9:1. This completed the hydrolysis step. The mixture was refluxed for 30 minutes (particle growth), heating was discontinued and the gel formed by passing ammonia gas into the mixture (gelation).

The gel was divided into thirds. One portion was used in an unrelated experiment. The second portion was slurried in 300 mL of 1-propanol containing 5 mL of concentrated ammonium hydroxide, refluxed for 1 hour (aging) and the product recovered by filtering. The slurrying, refluxing, and filtering process was repeated twice. The final product was dried in a vacuum oven and calcined as before to produce Silica $C_1$. Analysis showed it to have a pore volume of 3.0 mL/g and a surface area of 500 m$^2$/g. The third gel portion was slurried in 300 mL of 1-propanol containing 5 mL of concentrated ammonium hydroxide and the mixture was refluxed for 1 hour. Then 50 mL of toluene was added, the water removed as an azeotrope and the dewatered product recovered by filtration. The product was dried in a vacuum oven and calcined to obtain Silica $C_2$. Analysis showed it to have a pore volume of 2.3 mL/g and a surface area of 470 m$^2$/g.

Silica D

A mixture was formed from 146 mL (0.508 mole) of tetra-n-propyl orthosilicate, 90 g (5 moles) of water, 64 mL (0.858 mole) of 1-propanol, and 0.25 mL (0.005 mole) of concentrated sulfuric acid. The silicate ester and water were added slowly as the ester hydrolyzed, this constituting the hydrolysis step. The mixture was refluxed for 2 hours (particle growth), heating stopped and a gel was formed by passing ammonia gas into the mixture (gelation). Then 300 mL of 1-propanol containing 5 mL of concentrated ammonium ammonium hydroxide was mixed with the gel and the mixture was refluxed for another hour (aging). Finally, 50 mL of toluene was added and the water removed as an azeotrope. The dewatered product was separated by filtration, dried in a vacuum oven, and calcined as before to produce Silica D. Analysis showed it to have a pore volume of 3.1 mL/g and a surface area of 700 m$^2$/g.

Silica E

To 300 mL (4.02 moles) of a 1-propanol, while stirring, was added dropwise 57 mL (85.5 g, 0.503 mole) of silicon tetrachloride. Then 0.25 mL (0.005 mole) of concentrated sulfuric acid was added to the stirred mixture and it was refluxed for 1 hour to remove the HCl. This constituted the ester forming step. To the mixture was slowly added with stirring 90 g (5 moles) of water. The calculated $H_2O:Si(OC_3H_7)$ mole ratio was about 9.9:1. Following this hydrolysis, a gel was formed by passing ammonia gas into the reaction mixture. There was still some solvent present since sufficient alcohol was used to leave 2 moles after reaction with the silicon tetrachloride. The gel was stirred, heated for 2 hours at about 89° C., then the product was isolated by filtration and dried in a vacuum oven. The dried material was then calcined as before to yield Silica E. Analysis showed that it had a pore volume of 2.9 mL/g and a surface area of 826 m$^2$/g.

Example 2—Ethylene Polymerization

To demonstrate that catalysts produced according to the invention are active for ethylene polymerization, a sample of Catalyst A was used to polymerize ethylene in a slurry (particle form) process conducted at 107° C. Polymerization was conducted in a 2 L stirred reactor containing about 1 liter of isobutane at a reactor pressure of 3.89 MPa (565 psia). In a short (34 minutes) run, 238.3 g of polymer was produced in the presence of 0.0404 g of catalyst to give a calculated catalyst productivity value of 5900 g polymer per g catalyst. The melt index of the polyethylene produced was found to be 1.5 according to ASTM D1238-65T, Condition E. The short run time is indicative of a very active catalyst. The melt index of 1.5 is considered to be high in view of the fact that the catalyst was activated at a relatively low temperature of 760° C. in air. The activity of this catalyst was equal to or better than the best commercial cogel catalyst.

Other catalysts produced in accordance with this invention gave melt index values of 1.46, 2.01 and 2.34. Some catalysts produced in accordance with this invention gave low melt index, one as low as 0.06. This may be the result of putting together the less preferred of several of the significant variables, i.e., too little water, too short time and too low temperature for the particle growth or too short aging time or these may have just been "flukes" which is not uncommon in laboratory preparation of catalysts. In any event, the best values routinely obtained with the invention, i.e., 1.5 to better than 2.0 are above the best values of 0.9 to 1.1 obtainable under similar conditions for conventional aqueously produced titanium cogel. Thus, the invention provides the dual advantage of producing a superior catalyst for high melt index polymer and doing it at a lower cost. Also, since this is inherently a relatively inexpensive procedure, it is of value in producing lower pore volume higher surface area silica (which gives lower MI polymer) by using the less preferred conditions even though such silicas are available from conventional sources.

The remaining silicas produced as described in Example I are all characterized with pore volumes at least as high as that of Catalyst A (pore volume of 2.3 mL/g and surface area of 550 m$^2$/g). The values range from 2.3-3.5 mL/g and the surface areas range from 470-826 m$^2$/g). It is known from the prior art that a correlation exists between catalyst support pore volume and ethylene polymer melt index with supported chromium oxide catalysts. At constant catalyst activation temperatures and constant polymerization temperatures, as the catalyst support volume increases, the melt index capability of the catalyst also increases. Thus, the catalysts produced according to this invention are active in ethylene polymerization and polymers having relatively high melt index values are expected to be produced under particle form polymerization conditions.

Gels produced from alkali metal silicates by reaction with acids can also yield high pore volume silicas or silicas in admixture with other metal oxides such as titania, chromium oxide, and the like. Generally, such silicas having a pore volume of about 2 to 3 mL/g will exhibit surface areas ranging from about 400 to 500 m$^2$/g.

In contrast the gels of this invention can have pore volumes ranging from about 2 to 4 mL/g and surface areas ranging from about 300 to 1000 m²/g, usually 430 to 950 m²/g.

Example III

The following tabulation shows the effect of varying the ratio of water:silicon tetraethoxide in runs similar to that producing Catalyst A.

| Run | $H_2O:Si(OC_2H_5)_4$ | Recovered, Calcined Silica Pore Volume, ml/g | Surface Area, m²/g |
| --- | --- | --- | --- |
| 1 | 1:1 | 0.31 | (1) |
| 2 | 2:1 | 1.94 | 970 |
| 3 | 3:1 | 2.51 | 809 |
| 4 | 5:1 | 3.22 | 555 |

(1) Could not be measured accurately.

Later work showed that it was preferred to use only about a 1:1 ratio initially and then, after the hydrolysis was complete and any titanium to be added was added, add more water prior to particle growth, still keeping the total ratio below 20:1. The reason for this is twofold; first the beneficial effects of water eventually level off and second, addition of too much water destroys one of the advantages of this invention, the relatively small amount of water to be removed.

While this invention has been described in detail for the purpose of illustration, it is not to be construed as limited thereby but is intended to cover all changes and modifications within the spirit and scope thereof.

I claim:

1. A method comprising: combining a silicate ester and water under hydrolysis conditions in the presence of a sufficient amount of solvent such that the reaction mixture remains a single phase, after hydrolysis is essentially complete adding more water and maintaining the resulting composition at an elevated temperature to induce particle growth, thereafter adding sufficient acid neutralizing agent to form a gel, and separating water and solvent from the resulting silica.

2. A method according to claim 1 wherein said ester and water are added slowly to a small amount of initial solvent such that the water and ester are used up in said hydrolysis about as fast as they are added and alcohol is progressively formed from the hydrolysis, thus serving as additional solvent as progressively more ester and water are added and progressively more hydrolyzed ester is formed.

3. A method according to claim 2 wherein said solvent is an alcohol.

4. A method according to claim 3 wherein said alcohol is the same as the alcohol formed from said hydrolysis.

5. A method according to claim 1 wherein said solvent is present initially in an amount of about 0.1 to 10 volume percent based on the volume of all of the ester ultimately added.

6. A method according to claim 1 wherein the amount of water added during said hydrolysis is about the stoichiometric amount needed to react with essentially all of the ester groups in said silicate ester.

7. A method according to claim 6 wherein the total amount of water added is no more than 20 times the stoichiometric amount needed to react with the ester groups.

8. A method according to claim 1 wherein said acid neutralizing agent is one of ammonia or propylene oxide.

9. A method according to claim 8 wherein said acid neutralizing agent is ammonia gas.

10. A method according to claim 8 wherein after said acid neutralizing agent is added and said gel formed, additional solvent is added.

11. A method according to claim 10 wherein after said solvent is added subsequent to said gelation, said composition is aged prior to removal of the water.

12. A method according to claim 11 wherein said aging step is carried out for a time of 1 to 2 hours.

13. A method according to claim 1 wherein said silica is dried in an air oven at a temperature at or below the boiling point of said solvent.

14. A method according to claim 1 wherein said water is removed by forming an azeotrope with said solvent and wherein a second solvent which second solvent is not miscible with water is added after said gel is formed so as to give two phases in the azeotrope so that the water can easily be separated from the solvent in the azeotrope.

15. A method according to claim 14 wherein said second solvent is toluene.

16. A method according to claim 1 wherein said hydrolysis conditions include an acid catalyst.

17. A method according to claim 16 wherein said catalyst is sulfuric acid.

18. A method according to claim 17 wherein said acid is present in an amount within the range of 0.0005 to 0.05 moles of acid per mole of water used in said hydrolysis.

19. A method according to claim 1 wherein said silicate ester is represented by the formula $Si(OR)_4$ where R is an alkyl group containing 1 to 6 carbon atoms.

20. A method according to claim 19 wherein said alkyl group contains 3 to 4 carbon atoms.

21. A method according to claim 20 wherein said silicate ester is tetra-n-propyl orthosilicate.

22. A method according to claim 1 wherein said solvent is a 1 to 6 carbon atom alcohol.

23. A method according to claim 20 wherein said solvent is a 3 to 4 carbon atom alcohol.

24. A method according to claim 23 wherein said solvent is 1-propanol.

25. A method according to claim 1 wherein said hydrolysis is carried out under reflux conditions.

26. A method according to claim 25 wherein no mechanical agitation is utilized after the gelation.

27. A method according to claim 1 wherein a titanium compound is added after at least a part of said hydrolysis has been carried out and before said gel is formed.

28. A method according to claim 27 wherein said titanium compound is added after said hydrolysis is essentially complete and after said addition of said titanium compound, and before said acid neutralizing agent is added, more water is added and the resulting composition is maintained at an elevated temperature to induce particle growth.

29. A method according to claim 28 wherein said titanium compound is titanium tetraisopropoxide.

30. The product produced by the process of claim 1.

31. The product of claim 30 further characterized by a pore volume within the range of 2 to 4 mL/g and a surface area of 430 to 950 m²/g.

32. A method according to claim 1 further characterized by adding a chromium compound to give a final product catalytically active for olefin polymerization.

33. A method according to claim 32 wherein said chromium is added in an amount sufficient to give 0.1 to 5 weight percent chromium based on the weight of the final activated catalyst.

34. A method according to claim 33 wherein said chromium is added during or after hydrolysis and prior to gellation.

35. A method according to claim 34 wherein said chromium is added in the form of chromium(III) acetate.

36. A method according to claim 34 wherein a titanium compound is also added to give a tergel said titanium being added before the chromium.

37. A method according to claim 32 wherein said chromium is added after gelation and before said water and solvent are separated.

38. A method according to claim 37 wherein said chromium compound is selected from chromium(III) acetate and $CrO_3$.

39. A method according to claim 32 wherein said chromium is added anhydrously after said water and solvent have been separated.

40. The product produced by the process of claim 32.

41. The product of claim 40 further characterized by a pore volume within the range of 2 to 4 mL/g and a surface area of 430 to 950 $m^2/g$.

42. A method of producing a catalyst comprising: combining a silicate ester of the formula $Si(OR)_4$ wherein R is a 3 to 4 carbon atom alkyl group, and water by slowly adding said ester and said water to a solvent-water-sulfuric acid catalyst mixture which mixture contains said solvent in an amount within the range of 0.1 to 10 volume percent based on the total volume of all of the ester ultimately to be added, said solvent being a 3 or 4 carbon atom alcohol, said water and ester being added slowly so that the water and ester are used up in said hydrolysis about as fast as they are added, alcohol progressively formed from the hydrolysis then serving as the solvent as progressively more ester and water are added and progressively more hydrolyzed ester is formed, the total amount of water being about a stoichiometric amount needed to react with the available ester groups, said hydrolysis being carried out at about reflux temperature, after said hydrolysis is complete adding an alcohol soluble titanium compound, thereafter adding additional water and holding at an elevated temperature for 1 to 5 hours to permit particle growth, adding a chromium compound soluble in the reaction mixture and thereafter introducing ammonia to bring about gelation, thereafter aging at reflux temperature for 1 to 2 hours, removing the water and solvent and drying the resulting silica.

43. A method according to claim 42 comprising in addition activating the silica resulting after said water and solvent have been separated by heating in air at a temperature within the range of 315° to 760° C.

44. A method according to claim 43 wherein said chromium compound is chromium(III) acetate and said titanium compound is titanium tetraisopropoxide.

45. A method according to claim 44 wherein said water is removed by azeotropic distillation and said drying is carried out in an air oven.

46. A method according to claim 45 wherein said ester is tetra-n-propyl orthosilicate, and said solvent is n-propyl alcohol.

47. The product produced by the process of claim 46.

48. The product produced by the process of claim 42.

49. A method comprising slowly adding a silicate ester and water to a small amount of solvent under hydrolysis conditions such that the water and ester are used up in said hydrolysis about as fast as they are added and alcohol is progressively formed from the hydrolysis, thus serving as additional solvent as progressively more ester and water are added and progressively more hydrolyzed ester is formed, thereafter adding sufficient acid neutralizing agent to form a gel, and separating water and solvent from the resulting gel.

* * * * *